United States Patent
Li et al.

(10) Patent No.: US 7,570,646 B2
(45) Date of Patent: Aug. 4, 2009

(54) APPARATUS AND METHOD FOR AN INTERFACE UNIT FOR DATA TRANSFER BETWEEN A HOST PROCESSING UNIT AND A MULTI-TARGET DIGITAL SIGNAL PROCESSING UNIT IN AN ASYNCHRONOUS TRANSFER MODE

(75) Inventors: Martin Li, Missouri City, TX (US); Jay B. Reimer, Houston, TX (US); Shakuntala Anjanaiah, Stafford, TX (US); Natarajan Seshan, Houston, TX (US); Patrick J. Smith, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 860 days.

(21) Appl. No.: 09/964,158

(22) Filed: Sep. 26, 2001

(65) Prior Publication Data
US 2003/0076839 A1    Apr. 24, 2003

Related U.S. Application Data

(60) Provisional application No. 60/237,237, filed on Oct. 2, 2000.

(51) Int. Cl.
*H04L 12/28* (2006.01)

(52) U.S. Cl. .............. 370/395.1; 370/428; 370/384; 370/389; 370/392; 370/463; 370/419; 370/426; 370/395.72; 709/203; 709/208; 709/209; 710/22

(58) Field of Classification Search .............. 370/428, 370/384, 389, 392, 395.72, 466, 467, 463, 370/419, 395.2, 395.32, 395.1, 426; 709/203, 709/208, 209; 710/22, 52
See application file for complete search history.

(56) References Cited

U.S. PATENT DOCUMENTS

| | | | | | |
|---|---|---|---|---|---|
| 5,805,927 | A | * | 9/1998 | Bowes et al. ................... 710/23 |
| 5,870,628 | A | * | 2/1999 | Chen et al. ..................... 710/22 |
| 5,941,952 | A | * | 8/1999 | Thomas et al. .............. 709/234 |
| 5,983,332 | A | * | 11/1999 | Watkins ....................... 711/202 |
| 6,029,212 | A | * | 2/2000 | Kessler et al. .................. 710/52 |
| 6,122,680 | A | * | 9/2000 | Holm et al. .................... 710/52 |
| 6,141,744 | A | * | 10/2000 | Wing So ....................... 712/35 |
| 6,421,343 | B1 | * | 7/2002 | Jun et al. ................ 370/395.72 |
| 6,732,206 | B1 | * | 5/2004 | Jensen et al. ................. 710/105 |
| 7,002,979 | B1 | * | 2/2006 | Schneider et al. ............ 370/412 |
| 2002/0031141 | A1 | * | 3/2002 | McWilliams ................ 370/463 |

* cited by examiner

*Primary Examiner*—Aung S Moe
*Assistant Examiner*—Christopher P Grey
(74) *Attorney, Agent, or Firm*—Wade J. Brady, III; Frederick J. Telecky, Jr.

(57) ABSTRACT

A slave interface unit controls the exchange of data between a master processing unit and a plurality of slave processing units operating in the asynchronous transfer mode (ATM) of operation. The ATM slave interface unit has a receive unit and a transmit unit that exchange data cells and control signals with the ATM master processing unit. The receive unit and the transmit unit are coupled to a receive buffer storage unit and a transmit buffer storage unit, respectively. The receive buffer storage unit and the transmit buffer storage unit exchange data and control signals with the direct memory access unit. The ATM slave interface unit includes a configuration interface unit having a register that identifies the location in the data cell where the destination address is located and relates the destination address to the particular processing unit or memory location. The receive buffer unit uses the information in the register to determine the destination of the data cell.

11 Claims, 3 Drawing Sheets

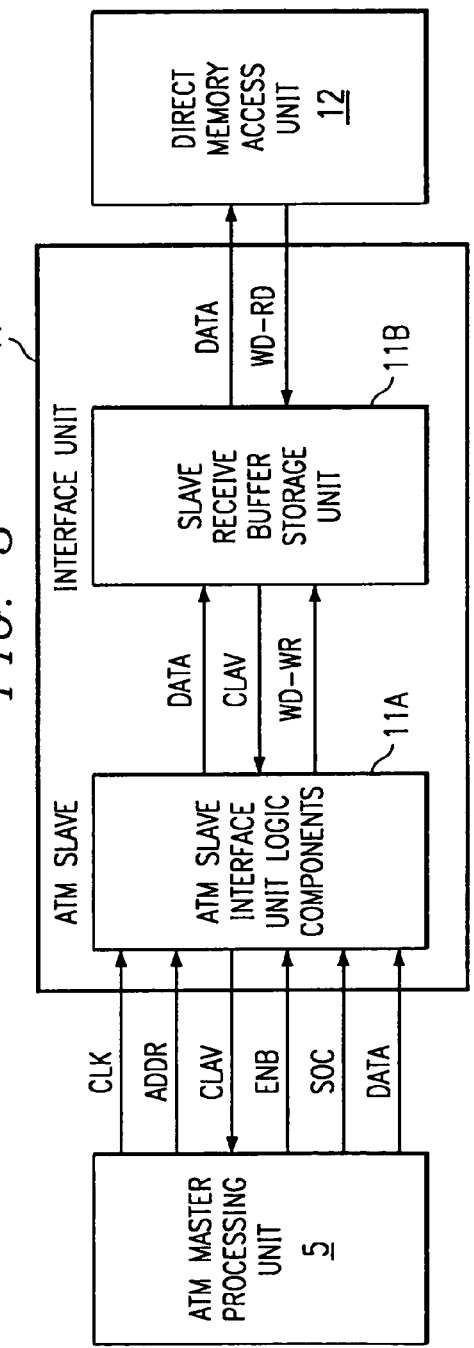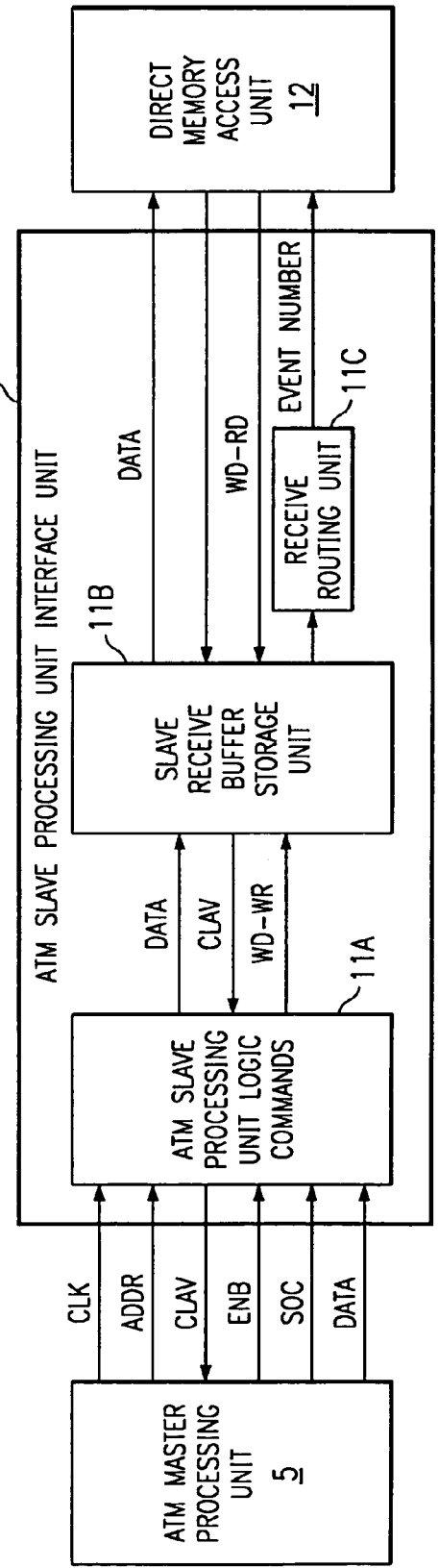

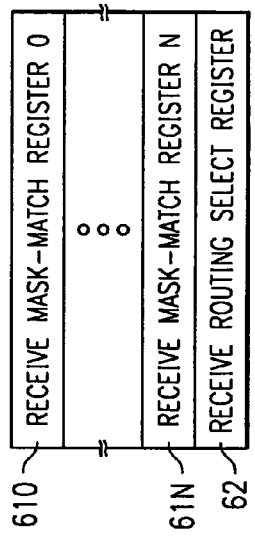
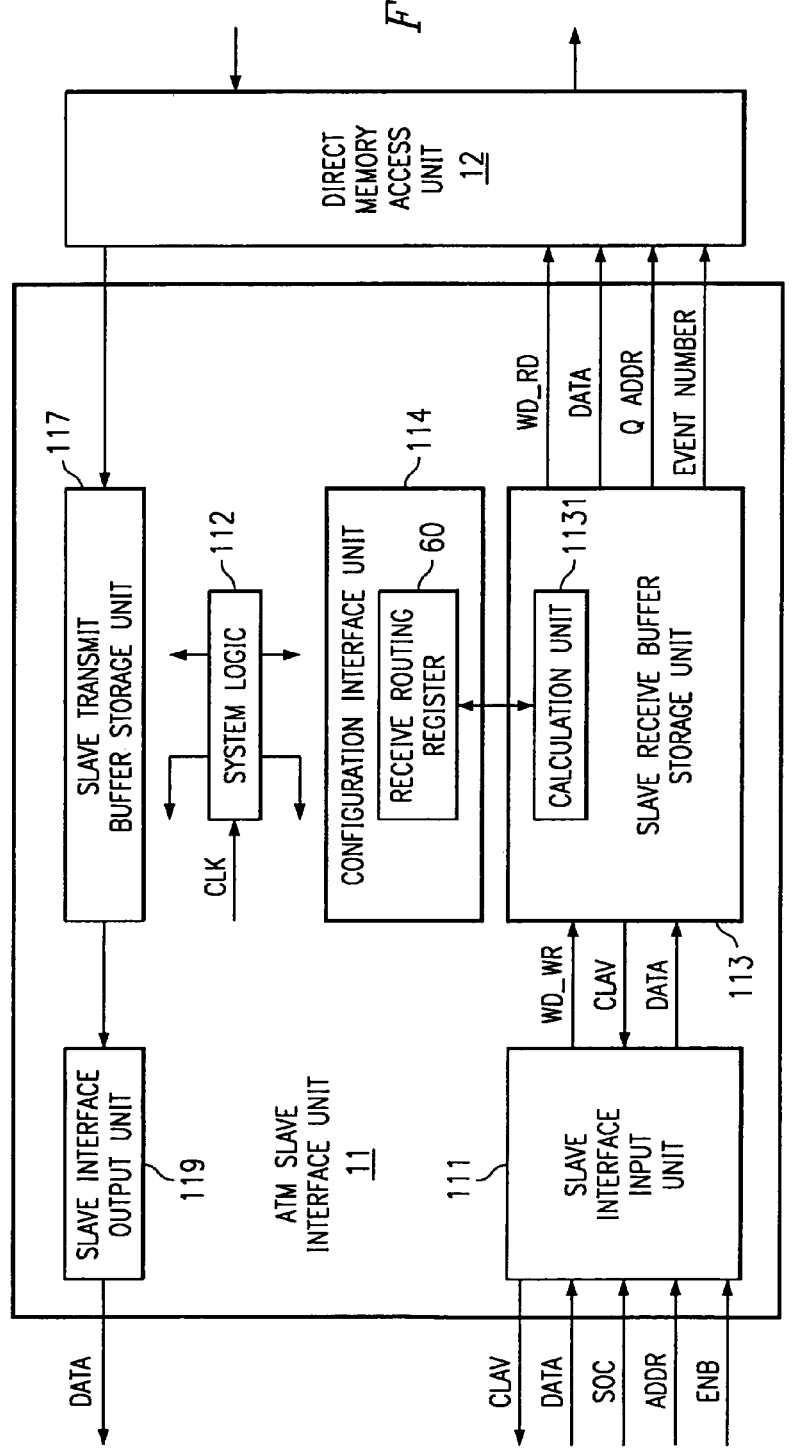

APPARATUS AND METHOD FOR AN INTERFACE UNIT FOR DATA TRANSFER BETWEEN A HOST PROCESSING UNIT AND A MULTI-TARGET DIGITAL SIGNAL PROCESSING UNIT IN AN ASYNCHRONOUS TRANSFER MODE

This application claims priority under 35 USC 119(e)(1) of Provisional Application Ser. No. 60/237,237, filed Oct. 2, 2000.

RELATED APPLICATIONS

APPARATUS AND METHOD FOR AN INTERFACE UNIT FOR DATA TRANSFER BETWEEN PROCESSING UNITS IN THE ASYNCHRONOUS TRANSFER MODE; U.S. patent application Ser. No. 09/964,315; filed on even data herewith; invented by Shakuntala Anjanaiah and Natarajan Seshan; and assigned to the assignee of the present application: APPARATUS AND METHOD FOR AN INTERFACE UNIT FOR DATA TRANSFER BETWEEN DATA PROCESSING UNITS IN THE ASYNCHRONOUS TRANSFER MODE AND IN THE I/O MODE; U.S. patent application Ser. No. 09/964,159; filed on even date herewith; invented by Shakuntala Anjanaiah, Roger Kyle Castille, and Natarajan Seshan; and assigned to the assignee of the present application: and APPARATUS AND METHOD FOR INPUT CLOCK SIGNAL DETECTION IN AN ASYNCHRONOUS TRANSFER MODE INTERFACE UNIT; U.S. patent application Ser. No. 09/964,164; filed on even date herewith; invented by Shakuntala Anjanaiah; and assigned to the assignee of the present application are related applications.

BACKGROUND OF THE INVENTION

1. Field of the Invention

This invention relates generally to data processing systems and, more particularly, to data processing systems having a master processing unit and at least one slave digital signal processing unit. An slave interface unit is inserted between the master processing unit and the digital signal processing units(s) to facilitate the exchange of data there between.

2. Background of the Invention

As the requirements for computational power have increased, one data processing system that has been increasingly employed to meet these requirements includes a master processing system that controls the operation of one or more slave digital signal processing units. The master processing unit, typically a general purpose microprocessor, has the flexibility to respond to a wide variety of conditions and provide an appropriate response. The digital signal processing units provide specialized capabilities that permit complex but repetitive tasks to be performed very rapidly. Thus, one or more slave digital signal processing units, operating under control of a master processing unit, can respond to a wide variety of computational-intensive requirements. However, the master processing unit and the digital signal processing unit are typically not directly compatible and may even be fabricated by different manufacturers. In order to permit the interchange of data between incompatible components or components which can exchange data with difficulty, standard signal protocols have been agreed upon to provide the requisite commonality. As an example, the asynchronous transfer mode defines signals that facilitate the exchange of data signal groups between a master processing unit and at least one digital signal processing unit. This protocol is provided for the Universal Test and Operations Interface for the asynchronous transfer mode (ATM) (UTOPIA) Level 2 Interface to conform to the ATM Forum standard specification af-phy-0039.000, as well as other applicable standards. The ATM cell or packet that is transferred in this protocol includes 53 bytes with a 5 byte header and a 48 byte payload in an 8-bit transfer mode, or 54 bytes with a 6 byte header and a 48 byte payload in a 16-bit transfer mode.

While the asynchronous transfer mode provides a convenient protocol for the exchange of data signals between the processing units, an interface unit must be provided to buffer the data signals. In addition to the transmit and receive functions that must be performed by the interface unit, a common configuration requires that one of the processing units operate in a master state while one or more other processing units coupled to the master processing unit has a slave status. Furthermore, the operational frequency of the processing units can have different clock frequencies.

The situation can be complicated still further in that each digital signal processing unit can have more than one processing units or cores associated therewith. In this situation, the data cells must be distributed efficiently among the plurality of processing cores.

A need has therefore been felt for apparatus and an associated method having the feature that an interface unit compatible with the asynchronous transfer mode is provided between a master processing unit and at least one slave processing unit. It would be a further feature of the apparatus and associated method that slave processing unit be digital signal processing unit. It would be a more particular feature of the apparatus and associated method that the slave processing unit be a digital processing unit with a plurality of core processing units. It would be yet a further feature of the apparatus and associated method to provide buffer storage unit capable of storing two data cells. It would be a still further feature of the apparatus and associated method to transfer data cells from the interface unit to the direct memory management unit on consecutive clock cycles. It would be a more particular feature of the present invention that the buffer storage unit be a first-in/first-out memory unit.

SUMMARY OF THE INVENTION

The aforementioned and other features can be accomplished, according to the present invention, by an asynchronous transfer mode (ATM) interface unit mediating the exchange of data between an ATM master processing unit and a direct memory access unit transferring data to and from a plurality of ATM slave processing units. The ATM slave interface includes a slave input unit and a slave output unit for exchanging data cells and control signals with the ATM master processing unit. The ATM slave interface unit includes a slave receive buffer storage unit and a slave transmit buffer storage unit for exchanging data cells and control signals with the slave processing units through the direct access memory unit. The ATM slave interface unit includes a register that identifies the location in the data cell wherein is stored the destination location, The register also includes the translation of the destination locations from the signals in the data cell to the location in the slave processing unit(s). In the preferred embodiment, the slave receive buffer storage unit and the slave transmit buffer storage unit are implemented with first-in/first-out storage units. The buffer storage units have the capacity to store two data cells. In this manner, data cells can the transferred on consecutive clock cycles when the destination storage locations are available. The slave interface unit is implemented to be consistent with UTOPIA format control signals.

Other features and advantages of present invention will be more clearly understood upon reading of the following description and the accompanying drawings and the claims.

BRIEF DESCRIPTION OF THE DRAWINGS

FIG. 3 illustrates the flow of signals in the ATM slave interface unit implemented with a first-in/first-out storage unit in the master transmit mode according to the present invention.

FIG. 4 illustrates the flow of signals in the ATM slave interface unit when a receive routing unit is added to FIG. 3.

FIG. 5 is a block diagram of an ATM slave interface unit according to the present invention.

FIG. 6 illustrates the format of the receive routing register according to the present invention.

DESCRIPTION OF THE PREFERRED EMBODIMENTS

1. Detailed Description of the Figures

Figure 1:
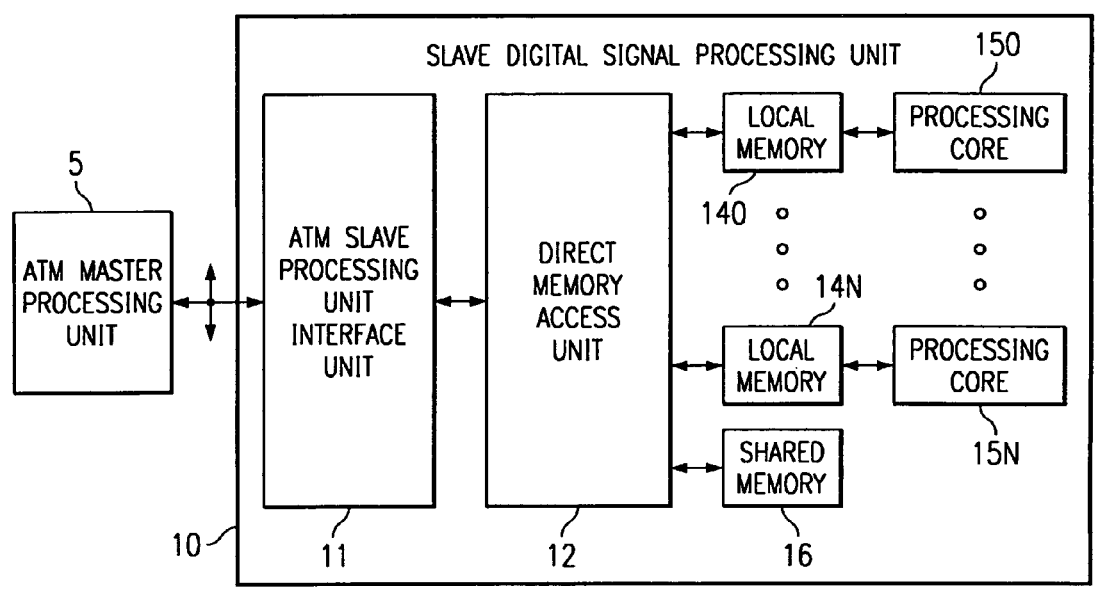
FIG. 1 is a block diagram of the general data processing system according to the present invention.

Referring to FIG. 1, a block diagram of a data processing system capable of advantageously using the present invention. Master ATM processing unit 5 exchanges signals with at least one digital signal processing unit 10. In particular, the Master ATM processing unit exchanges signals with the slave interface unit 11 of the digital signal processing unit 10. The slave ATM interface unit 11 exchanges signals with the direct memory access unit 12. The direct memory access unit 12 exchanges signals with local memories 140 through 14N and with shared memory 16. Each local memory 140 through 14N is coupled to a processor core 150 through 15N, respectively. This block diagram includes only those components necessary to the understanding of the present invention. As will be clear, a digital signal processing unit is more complex than is indicated by this FIG. 1.

Referring to Table 1, the required signals for the ATM Forum Technical Committee's UTOPIA Level 2, Version 1.0 (af-phy-0039.000) are listed. Note that optional signals, not included in Table 1, are identified.

TABLE 1

| Signal Name | ATM Controller Master (Dir) | ATM Controller Slave (Dir) |
|---|---|---|
| Transmission Mode | | |
| Clk | In | In |
| Add[4:0} | Out | In |
| Clav | In | Out |
| Enb | Out | In |
| SOC | Out | Out |
| Data [15:0] | Out | Out |
| Receive Mode | | |
| Clk | In | In |
| Addr {4:0] | Out | In |
| Clav | In | Out |
| Enb | Out | In |
| SOC | In | In |
| Data {15:0} | In | In |

In the transmit slave mode, the Utopia ATM signals have the following meaning. The CLK signal is a clock input signal driven by the master processing unit. The TRANSMIT DATA and TRANSMIT CONTROL signals are synchronized with this CLK signal. The ADDR {4:0] is 5-bit address signal group generated by the master processing unit. This address signal group is used to select one of a plurality (up to 31) of slave devices in the system. The CLAV signal is a transmit cell available status output signal of the slave device. For a cell level handshake, a 0 logic level indicates that the slave unit does not have a complete cell (packet) for transmission, while a logic 1 indicates that the slave has a complete cell to transmit. The ENB signal is a transit interface enable signal input signal. This signal is asserted low by the master processing unit to indicate that the slave processing unit should apply the first byte of valid data and the SOC (start-of-cell) signal in the next clock cycle. The SOC signal is the start of cell signal (active high) that is generated by the slave processing unit on the rising edge of the CLK signal to indicate that the first valid byte of the cell is available on the transmit data bus. The DATA [15:0] signals are provided by the slave processor during the transmission of the transmit data bus on the CLK rising edge. The processor exchanges a CLAV signal and WRD_RDY signal to provide for the transfer of the DATA [31:0] signals from the first in/first out memory unit 182 to the processor for transmission to the processor and to the external data processing unit. The WD_WR signal, the NOTFULL signal, and the ADDR [31:0] signals are used to implement the transfer of the DATA [31:0] signals from the direct memory access unit 14 to the first in/first out memory unit 182. (The system can operate in an 8 bit mode [7:0].)

In the receive slave mode, the CLK signal is a clock signal applied to the interface unit by the master processor. The receive data and control signals are sampled and are synchronous to this clock signal. The ADDR [4:0] signals are applied to the interface unit by the master processor and identify one of the slave units (up to 31) in the system. The CLAV signal is the receive cell available output signal from the slave processor unit to indicate that the slave processor has space available to receive a cell from the master processor. In the handshake procedure, the 0 logic bit indicates that no space is available to receive a cell from the master processor. The 1 logic bit indicates that space is available to receive a cell from the master processor. The ENB signal is an active low signal generated by the master processor to enable the receive interface of the slave processor. This signal indicates that the interface is to sample receive data signal and the SOC signal during the next clock cycle or thereafter. The SOC signal is generated by the master processor and indicates that the first valid byte of the cell is available on the receive data bus for the slave processor to sample. The DATA [15:0] signals are applied by the master processor to the data receive bus and sampled on the rising edge of the CLK signal.

Figure 2:
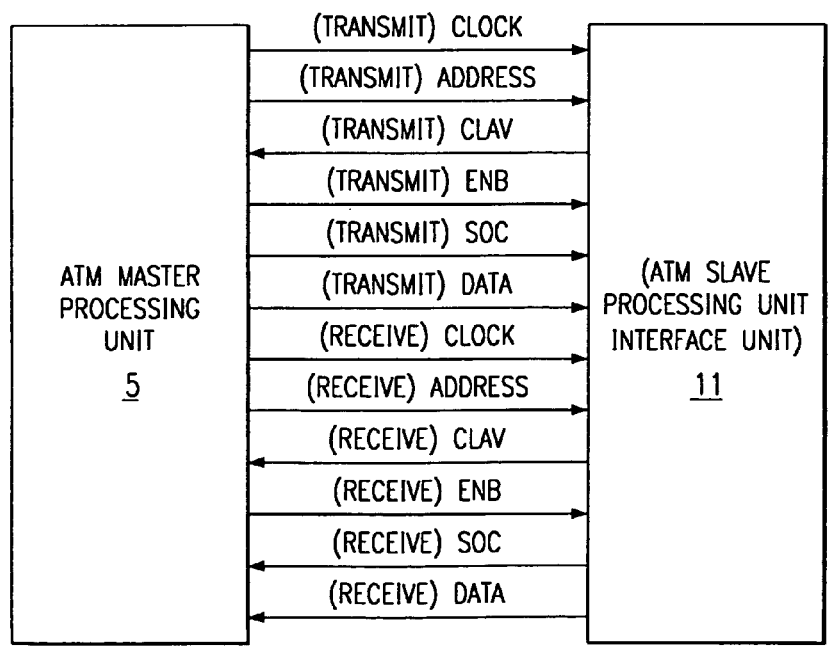
FIG. 2 illustrates the signals and the signal direction exchanged between the ATM master processing unit and the ATM slave interface unit in the receive mode and in the transmit mode.

Referring to FIG. 2, the signals, as defined above, exchanged between the ATM master processing unit 5 and the ATM slave processing unit interface unit 11 for the (master) transmit mode and the (master) receive mode. The direction of the CLK signal, the ADDR signal, the CLAV signal, the ENB signal, the SOC signal and the data signal in both the transmit mode and the receive mode are illustrated.

Referring to FIG. 3, the flow of signals in an ATM slave interface unit 11 in the slave receive mode when the ATM slave interface unit is implemented with slave receive buffer storage 113. The portion of the ATM slave interface unit, other than the buffer storage 113 is designated ATM slave interface unit logic components 11A. In the receive mode, the ATM slave interface unit logic components 11A exchange the signals with the ATM master processing unit 5 that are illustrated in FIG. 2. The ATM slave interface unit logic components applies the DATA signals and the WD_WR (WORD READ) signal to the slave receive buffer storage 113 and receives the CLAV signal from the slave receive buffer storage unit. 113. The slave receive buffer storage 113 applies the DATA signals to the direct memory access unit 12 and receives the WD_RD (WORD READ) signals from the direct memory access unit 12.

Referring to FIG. 4, the flow of signals in the receive mode in the ATM interface unit 11 when a receive routing unit 11B is included. The signals are distributed as shown in FIG. 3. However, a CLVAL (CELL VALUE) signal is applied to the receiver routing unit. Based on the CLVAL signal, the receive routing unit applies an EVENT # signal to the direct memory access unit 12. The EVENT # signal designates the target address of the cell being received from the ATM master processing unit 5.

Referring to FIG. 5, a block diagram of an ATM slave interface unit 11 is shown according to the present invention. The slave interface input unit 111 receives DATA signals from the ATM master processing unit 5. The slave interface unit 11 applies DATA signals to the slave receive buffer storage 113. The slave receive buffer storage 113 includes a calculation unit 1131. The slave receive buffer storage unit 113 receives signals from a configuration unit 14. The configuration unit 14 includes a receive routing register 60 that includes the data permitting the identification of the destination location. The information in the receive routing register permits the calculation unit 1131 to determine the EVENT# and, consequently, destination address of the ATM cell. The EVENT # and the ATM cell (DATA) are applied to the direct memory access unit 12 and are distributed to the appropriate destination locations. DATA to be transmitted to the ATM master processing unit 5 from the local memory/processor core unit(s) 140/150 through 14N/15N are applied to the direct memory access unit 12 and then to the slave transmit buffer storage unit 117. The ATM cell in the slave transmit buffer storage unit 117 is transferred through the slave interface output unit 119 to the ATM master processing unit. The control signals shown in FIG. 4 are repeated in FIG. 5 to illustrate how, in the slave receive mode, the UTOPIA control signals are buffered. The signals for the slave transmit mode can be derived from the control signals shown in FIG. 2. The system logic 112 receives the clock signal from the ATM master processing unit and reshapes and deskews the clock pulses. The clock pulses are then distributed to the other apparatus of the slave interface unit 119.

Referring to FIG. 6, the contents of the receive routing register 60 in FIG. 5 are shown. Receive mask-match register 62 through receive routing register N 61N identify the destination location of the cell data. The receive routing select register 62 identifies the location in the data cell that contains the address information and is the area that is interrogated by the contents of the receive mask-match register 610 through 61N to specify the target destination location.

2. Operation of the Preferred Embodiment

The present invention permits an information cell in the asynchronous transfer mode to be directed to one of a plurality of locations. A target or destination location is indicated in the data cell or the accompanying attached field. (While the data cell in the asynchronous transfer mode is 53 or 54 bytes in length, fields can be attached to the cell that includes information that could not be conveniently stored in the data cell of standard size.) For simplicity, the term data cell is used in a manner to include any attached fields. While the plurality of destination locations has been described in terms of a plurality of local memory/processor core units, it will be clear that the plurality of locations can be a plurality of locations in a storage unit (or any combination thereof).

The slave interface unit of the present invention buffers the data cells, i.e., the frequency between the communication bus the direct memory access unit. The data cells are buffered by using the slave receive buffer storage unit and the slave transmit buffer storage unit to store temporarily the data cells until a destination location is available. The ATM slave interface unit acts as an interface between the control signals of the direct memory access unit and the ATM master processing unit in the ATM slave receive mode. FIG. 3 and FIG. 4 show how the ATM slave interface unit manipulates the controls signals to provide an exchange of cells between the ATM master processing unit and the direct memory access unit. The control signals interface is implemented by using intermediate control signals between the ATM slave interface unit logic components and the slave buffer storage register.

In the preferred embodiment, both the slave receive buffer storage unit and the slave transmit buffer storage unit are implemented by first-in/first-out (FIFO) memory units. In addition, each of the FIFO storage units has been implemented to store two ATM cells (plus attachments, if any). The ability to store two data cells permits the data cells to be transferred on consecutive clock cycles when the destination locations are available.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. In a system in which an ATM slave processing unit is coupled to an ATM master processing unit by a communication bus, the interaction between the ATM master processing unit and the ATM slave processing unit having a UTOPIA format, an ATM slave interface unit providing an interface between the communication bus and a direct memory access unit coupled to the ATM slave processing unit, the interface unit comprising:

an input unit, the input unit receiving data cells and exchanging control signals with the ATM master processing unit;

an input buffer unit receiving data signals and exchanging control signals with the input unit, the input buffer unit including:

a buffer storage unit coupled to the input unit, the buffer storage unit being a first-in/first-out memory unit configured to store two data cells received from the input unit to permit the data cells to be transferred on consecutive clock cycles to a destination location when the destination location is available, the buffer storage unit transferring data cells to the direct memory access unit in response to a first READY signal; and a calculation unit;

a register, each data cell including a cell portion having the destination location encoded therein, the calculation unit responsive to the contents of the register and to the cell portion for generating the destination location for the data cell in the ATM slave processing unit;

an output buffer unit, the output buffer unit being a first-in first-out storage unit for storing data cells, the output buffer unit receiving data cells from the direct memory access unit in response to a second READY signal and exchanging control signals with the direct memory access unit; and an output unit, the output unit receiving data cells from the output buffer unit and applying data cells to the communication bus, the output unit exchanging control signals with the ATM master processing unit.

2. The interface unit as recited in claim 1 wherein the buffer storage unit transfers a data cell to the slave data processing unit every clock cycle.

3. The interface unit as recited in claim 1 wherein the destination locations are selected from at least one of the group consisting of a slave processing unit, shared memory locations for a plurality of slave processing units, and at least one slave processing unit and at least one shared memory location.

4. The interface unit as recited in claim 1 wherein the ATM slave processing unit includes at least one digital signal central processing unit.

5. The interface unit as recited in claim 1 wherein the interface unit operates at a first frequency and the direct memory access unit operates at a second frequency.

6. The interface unit as recited in claim 5 wherein the first frequency is a UTOPIA clock frequency.

7. A method for exchanging data cells from an ATM master processing unit with a plurality of locations in an ATM slave processing unit, over a communication bus, the ATM slave processing unit coupled to a direct memory access unit, the method comprising:

storing data cells from the ATM master processing unit in a buffer storage unit coupled to the communication bus, wherein the buffer storage unit is a first-in/first-out storage unit configured to store two of the data cells to permit the data cells to be transferred on consecutive clock cycles to a destination location;

generating the destination location for each of the data cells in the buffer storage unit responsive to the contents of the register and to a cell portion included in each of the data cells that has the destination location encoded therein;

generating a signal identifying the destination location;

when storage space is available, transferring a data cell from the buffer storage unit to the direct memory access unit in response to a first READY signal;

storing data cells in a output buffer unit received from the direct memory access unit in response to a second READY signal, wherein the output buffer unit is a first-in first-out storage unit and is configured to exchange control signals with the direct memory access unit; and receiving data cells at an output unit from the output buffer unit and applying data cells to the communication bus from the output unit, the output unit configured to exchange control signals with the ATM master processing unit.

8. The method as recited in claim 7 further comprising:
transferring a data cell from the buffer storage unit to the ATM slave processing unit on consecutive clock cycles.

9. The method as recited in claim 8 further comprising implementing the signals exchanged over the communication bus in a UTOPIA format.

10. The method as recited in claim 7 wherein the method includes applying the signal identifying the destination location to the direct memory access unit.

11. A data processing system comprising:

an ATM master processing unit;

a communication bus coupled to the ATM master processing unit;

an ATM slave processing unit, the ATM slave processing unit coupled to the ATM master processing unit via the communication bus and coupled to a direct memory access unit; and an ATM slave interface unit providing an interface between the communication bus and the direct memory access unit, the slave interface unit including:

an input unit, the input unit receiving data cells and exchanging UTOPIA format signals with the ATM master processing unit;

an input buffer unit receiving data signals and exchanging control signals with the input unit, the input buffer unit including:

a buffer storage unit coupled to the input unit, the buffer storage unit being a first-in/first-out memory unit configured to store two data cells received from the input unit to permit the data cells to be transferred on consecutive clock cycles to a destination location when the destination location is available, the buffer storage unit transferring the data cells to the direct memory access unit in response to a first READY signal; and a calculation unit;

a register, each data cell including a cell portion having the destination location encoded therein, the calculation unit responsive to the contents of the register and to the cell portion for generating the destination location for the data cell in the ATM slave processing unit;

an output buffer unit, the output buffer unit being a first-in first-out storage unit for storing data cells, the output buffer unit receiving data cells from the direct memory access unit in response to a second READY signal and exchanging control signals with the direct memory access unit; and an output unit, the output unit receiving data cells from the output buffer unit and applying data cells to the communication bus, the output unit exchanging UTOPIA format signals with the ATM master processing unit.

* * * * *

UNITED STATES PATENT AND TRADEMARK OFFICE
CERTIFICATE OF CORRECTION

PATENT NO. : 7,570,646 B2  Page 1 of 1
APPLICATION NO. : 09/964158
DATED : August 4, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1434 days.

Signed and Sealed this

Seventh Day of September, 2010

David J. Kappos
*Director of the United States Patent and Trademark Office*